(12) United States Patent
Komine

(10) Patent No.: US 8,925,930 B2
(45) Date of Patent: Jan. 6, 2015

(54) CHUCK DEVICE

(75) Inventors: Tsuyoshi Komine, Sumoto (JP);
Manabu Komine, legal representative, Sumoto (JP)

(73) Assignee: Big Alpha Co., Inc., Sumoto-shi, Hyogo (JP)

( * ) Notice: Subject to any disclaimer, the term of this patent is extended or adjusted under 35 U.S.C. 154(b) by 329 days.

(21) Appl. No.: 13/320,583

(22) PCT Filed: May 14, 2010

(86) PCT No.: PCT/JP2010/058197
§ 371 (c)(1),
(2), (4) Date: Feb. 1, 2012

(87) PCT Pub. No.: WO2010/134473
PCT Pub. Date: Nov. 25, 2010

(65) Prior Publication Data
US 2012/0119450 A1    May 17, 2012

(30) Foreign Application Priority Data
May 20, 2009  (JP) .................................. 2009-122134

(51) Int. Cl.
*B23B 31/20*  (2006.01)
(52) U.S. Cl.
CPC ........... *B23B 31/20* (2013.01); *B23B 2260/106* (2013.01)
USPC ............................................. 279/42; 279/48
(58) Field of Classification Search
USPC ............. 279/102, 103, 42, 48, 52, 43.9, 46.9, 279/51, 56
See application file for complete search history.

(56) References Cited

U.S. PATENT DOCUMENTS 2,141,786 A * 12/1938 Helgerud ...................... 408/140
2,529,396 A * 11/1950 Hunt ............................... 279/52
(Continued)

FOREIGN PATENT DOCUMENTS

| CN | 200977561 | 11/2007 |
| GB | 2056889 A | 3/1981 |

(Continued)

OTHER PUBLICATIONS

Office Action dated Mar. 25, 2013 in the corresponding CN patent application No. 201080021775.7.
(Continued)

*Primary Examiner* — Eric A Gates
*Assistant Examiner* — Paul M Janeski
(74) *Attorney, Agent, or Firm* — Muncy, Geissler, Olds & Lowe, P.C.

(57) ABSTRACT

A chuck device includes: a chuck body having a tapered hole at a front end portion and being fixed to a rotational spindle of the machine tool; a collet capable of being reduced in diameter and inserted into the tapered hole for holding the tool; and a nut that can be screwed to the chuck body for fastening the collet. A non-alignment prevention member is provided for suppressing relative movement by bringing the nut into radial contact with the chuck body even when the spindle of the machine tool is rotated and includes a first nut rear end side tapered surface at a farther rear end side than a screw portion, and a chuck body side tapered surface formed in the chuck body for coming into contact with the first nut rear end side tapered surface when the nut is screwed up.

5 Claims, 4 Drawing Sheets

(56) References Cited

U.S. PATENT DOCUMENTS

| | | | | |
|---|---|---|---|---|
| 2,654,611 A * | 10/1953 | Lee | | 279/56 |
| 2,815,217 A * | 12/1957 | Fortunski | | 279/51 |
| 2,989,316 A * | 6/1961 | Perry et al. | | 279/50 |
| 3,036,839 A * | 5/1962 | Williamson, Jr. | | 279/24 |
| 3,332,693 A * | 7/1967 | Armstrong et al. | | 279/47 |
| 3,365,204 A * | 1/1968 | Benjamin et al. | | 279/51 |
| 3,544,121 A * | 12/1970 | Mizoguchi | | 279/51 |
| 3,719,367 A * | 3/1973 | Baturka | | 279/145 |
| 3,726,532 A * | 4/1973 | Zeilinger | | 279/52 |
| 3,879,046 A * | 4/1975 | Alford | | 279/48 |
| 3,905,609 A * | 9/1975 | Sussman | | 279/20 |
| 4,562,329 A * | 12/1985 | Minton | | 219/99 |
| 4,817,972 A * | 4/1989 | Kubo | | 279/42 |
| 5,340,127 A * | 8/1994 | Martin | | 279/20 |
| 5,984,595 A | 11/1999 | Mizoguchi | | |
| 6,915,722 B2 * | 7/2005 | Komine | | 81/59.1 |
| 6,923,451 B2 * | 8/2005 | Taguchi et al. | | 279/42 |
| 7,306,238 B2 * | 12/2007 | Oshnock et al. | | 279/20 |
| 2009/0322042 A1 * | 12/2009 | Kitamura | | 279/49 |

FOREIGN PATENT DOCUMENTS

| | | |
|---|---|---|
| JP | 01-129005 U | 9/1989 |
| JP | 07-011242 U | 2/1995 |
| JP | 11-99441 A | 4/1999 |
| JP | 2001-219310 A | 8/2001 |

OTHER PUBLICATIONS

International Search Report mailed on Aug. 10, 2010 for the corresponding International patent application No. PCT/JP2010/058197.

International Preliminary Report on Patentability issued on Apr. 18, 2011 for the corresponding International patent application No. PCT/JP2010/058197.

Notification of Transmittal of Translation of the International Preliminary Report on Patentability mailed Dec. 15, 2011 in International Application No. PCT/JP2010/058197.

Supplementary European search report of EP10777706 mailed Mar. 27, 2014.

* cited by examiner

CHUCK DEVICE

CROSS REFERENCE TO RELATED APPLICATIONS

This application is a U.S. national stage application of PCT/JP2010/058197 filed on May 14, 2010, and claims priority to, and incorporates by reference, Japanese Patent Application No. 2009-122134 filed on May 20, 2009.

TECHNICAL FIELD

The present invention relates to a chuck device for mounting a tool on a rotational spindle of a machine tool.

BACKGROUND ART

Generally, a tool is mounted on a rotational spindle of a machine tool such as a machining center or a milling machine through a chuck device. An example of the chuck device is disclosed in Patent Document 1, which is shown in FIG. 6. A chuck device 101 shown in FIG. 6 including a chuck body 102, a collet 103 and a nut 104 is well known. The nut 104 is configured to be screwed to the chuck body 102 for fastening the collet 103 to hold a tool T.

Since the nut 104 serves to fasten the collet 103 to reduce the diameter of the collet 103, an arrangement in which a force is exerted radially inward is required. The invention disclosed in Patent Document 1 was made to address such a subject matter, in which a tapered surface 103a formed in the collet 103 and a tapered surface 104a formed in the nut 104 are brought into contact with each other when the nut is screwed to the chuck body. More particularly, the collet 103 and the nut 104 are brought into contact with each other at the tapered surfaces, thereby to press the collet 103 axially and fasten the collet 103 radially inward.

PRIOR ART DOCUMENT

Patent Document

Patent Document 1: Japanese Unexamined Patent Application Publication No. 2001-219310

SUMMARY OF INVENTION

Technical Problem

In the state shown in FIG. 6 in which the tool T is held, the nut 104 is fixed to the chuck body 2 only at a screw portion. However, since not a little gap is present in the screw structure, the nut 104 is radially movable relative to the chuck body 102. Such relative movement might lead to non-alignment of the nut 104 relative to the chuck body 102, as a result of which deflection of the tool T might occur.

The above-noted relative movement can be prevented up to a certain extent of rotational speed through the screwing-on force by fastening the nut 104, thereby to maintain the state when the nut 104 is fastened. However, if a centrifugal force is increased by high-speed rotation, the relative movement cannot be prevented only through the screwing-on force. Thus, the state when the nut is fastened cannot be maintained to cause the non-alignment of the nut 104 relative to the chuck body 102, as a result of which the deflection of the tool T occurs. Recently, machining in the machine tool has been increasingly speeding up, which produces growing demands for increasing the rotation rate of the spindle, increasing the feed speed and providing machining accuracy. Under the circumstances, there is an increasing need for preventing the deflection of the tool T resulting from the non-alignment of the nut 104 as noted above in order to suppress an extreme decline in life of the tool due to the deflection.

As a countermeasure therefor, as shown in FIG. 7, it is known to provide a guide portion 105 extending from a rear end portion of the nut 104. However, if a gap is present between the guide portion 105 and the chuck body 102 due to an error in manufacturing parts caused by gap fitting, the non-alignment of the nut 104 cannot be prevented. Assuming that no gap is present, the non-alignment of the nut 104 relative to the chuck body 102 is not avoidable if the diameter of the guide portion 105 is increased due to the centrifugal force.

The present invention has been made having regard to the above-noted problems, and its object is to provide a chuck device for suppressing the non-alignment of the nut relative to the chuck body not only when the nut is fastened but also when the machine tool is rotated at high speed, thereby to prevent the deflection of a tool.

Solution to Problem

A first characteristic feature of a chuck device relating to the present invention lies in comprising: a chuck body having a tapered hole at a front end thereof; a collet capable of being reduced in diameter and inserted into the tapered hole for holding a tool; a nut capable of being screwed to the chuck body to fasten the collet, and a non-alignment prevention member provided between the nut and the chuck body for suppressing relative movement by bringing the nut into radial contact with the chuck body even in time of rotation.

When the non-alignment prevention member is provided for allowing the nut to come into radial contact with the chuck body side even in time of rotation as defined by the first characteristic feature, the non-alignment can be prevented even if a centrifugal force is exerted on the nut owing to the rotation. It is preferable that the contacting force as noted above is produced by elastic deformation of either one of the nut and the chuck body, for example, because such a structure would be simple and cost effective.

A second characteristic feature of the chuck device relating to the present invention lies in the non-alignment prevention member includes a first nut rear end side tapered surface formed in an inner circumferential surface or an outer circumferential surface of the nut at a farther rear end side than a screw portion, and a chuck body side tapered surface formed in the chuck body for coming into contact with the first nut rear end side tapered surface when the nut is screwed up.

According to the second characteristic feature, the first nut rear end side tapered surface comes into contact with the chuck body side tapered surface when the nut is screwed up, thereby to allow increase of the diameter of a region in the vicinity of the contacting portion of the member disposed radially outward (the chuck body or the nut). Such increase in diameter would exert a elastic force radially inward on the chuck body or the nut to restore its original shape, thereby to prevent the non-alignment of the nut relative to the chuck body. Further, a wedging effect can be achieved through the contact at the tapered surfaces, thereby to prevent looseness and movement of the nut. In addition, since there is no need to provide any additional member, the device would be advantageous in terms of suppressing the increase in cost and reducing the number of parts.

A third characteristic feature of the chuck device relating to the present invention lies in the non-alignment prevention member includes a second nut rear end side tapered surface formed in an inner circumferential surface or an outer circumferential surface of the nut at a farther rear end side than a screw portion, and a ring member side tapered surface formed in a ring member attachable to the chuck body for coming into contact with the second nut rear end side tapered surface when the nut is screwed up and the ring member is attached to the chuck body.

According to the third characteristic feature, the second nut rear end side tapered surface comes into contact with the ring member side tapered surface when the nut is screwed up, thereby to allow increase of the diameter of a region in the vicinity of the contacting portion of the member disposed radially outward (the nut or the ring member). Such increase in diameter would exert a elastic force radially inward on the nut or the ring member to restore its original shape, thereby to prevent the non-alignment of the nut relative to the chuck body. Further, a wedging effect can be achieved through the contact at the tapered surfaces, thereby to prevent looseness and movement of the nut.

A fourth characteristic feature of the chuck device relating to the present invention lies in a fitting portion is provided between the nut and the chuck body to allow the nut to relatively rotatably fit to the chuck body at a farther front end side than the screw portion.

When the nut is configured to relatively rotatably fit to the chuck body as defined by the fourth characteristic feature, the nut is prevented from relatively moving in the radial direction without screw fastening of the nut being hindered. Such a member for preventing the nut from radially moving relative to the chuck body is provided in the farther front end side than the screw portion, thereby to improve the function to prevent the deflection as the entire chuck device.

MODE FOR CARRYING OUT INVENTION

Embodiments relating to the present invention will be described hereinafter.

First Embodiment

Figure 1A:
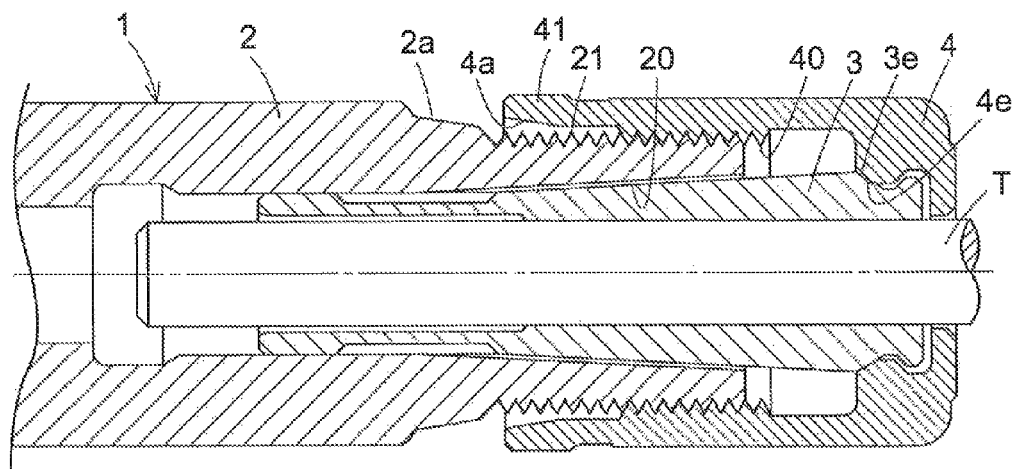
FIG. 1 is a vertical section of a chuck device according to a first embodiment of the present invention.
Figure 1B:
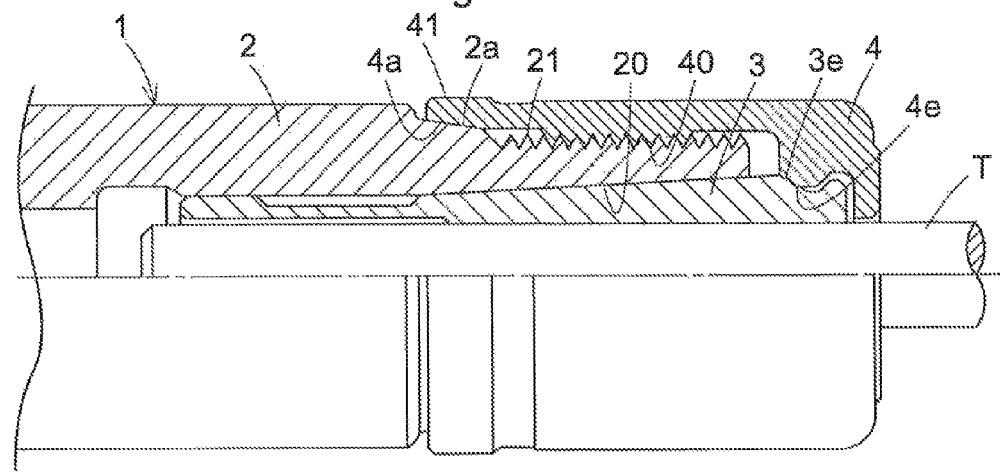

FIG. 1 is a vertical section of a chuck device 1 according to a first embodiment of the present invention. FIG. 1(a) shows a state before a nut 4 is screwed to a chuck body 2 while FIG. 1(b) shows a state after the nut 4 is screwed to the chuck body 2 to hold a tool T.

A tapered hole 20 is formed in a front end portion of the chuck body 2. A collet 3 is inserted into the tapered hole 20 to be fixed to the chuck body 2 through an unillustrated fixing member. The collet 3 has an unillustrated vertical groove to allow its diameter to be reduced. The nut 4 has a screw portion 40 to be screwed to the chuck body 2 having a screw portion 21. The tool T is gripped by the collet 3 fastened by the nut 4.

In the current embodiment, a chuck body side tapered surface 2a is formed at a farther rear end side than the screwed portion 21 of the chuck body 2 (left side in the drawings), while a first nut rear end side tapered surface 4a is formed in an inner circumferential surface of the nut at a farther rear end side than the screw portion 40 of the nut 4. Those tapered surfaces are configured to come into contact with each other when the nut 4 is screwed to the chuck body 2.

When the chuck body 2 and the nut 4 are screwed up and brought into contact with each other at the chuck body side tapered surface 2a and the first nut rear end side tapered surface 4a, the diameter of a nut rear end portion 41 is increased. As a result, a elastic force is produced radially inward in the nut rear end portion 41 to restore an original shape. Such a elastic force presses the nut rear end portion 41 against the chuck body 2, thereby to suppress non-alignment of the nut 4 relative to the chuck body 2 even when a great centrifugal force is exerted on the nut rear end portion 41 in high-speed rotation.

Further, in the current embodiment, a collet side tapered surface 3e formed in the vicinity of a front end of the collet 3 is configured to come into contact with a nut front end side tapered surface 4e formed in the nut 4 at a farther front end side than the screw portion 40 when the nut 4 is screwed up. The collet 3 and the nut 4 are brought into contact with each other at the tapered surfaces in this way, as a result of which the nut 4 is strongly fixed to the collet 3 due to a wedging effect to suppress the non-alignment. Further, since the force applied to the tapered surfaces is exerted axially and radially, the diameter of the collet 3 can be effectively reduced with the nut 4 being screwed up.

As noted above, the non-alignment of the nut 4 relative to the chuck body 2 is suppressed at the rear end side of the screw portion 40 while the non-alignment of the nut 4 relative to the collet 3 is suppressed at the front end side thereof. More particularly, the non-alignment of the nut 4 can be prevented at the two positions axially spaced from each other, thereby to improve the function for preventing the non-alignment of the tool T as the entire chuck device and to be durable against use in high-speed rotation. Further, since any additional member is required, an advantageous effect can be achieved in terms of reducing the manufacturing cost and the number of parts.

Second Embodiment

Figure 2:
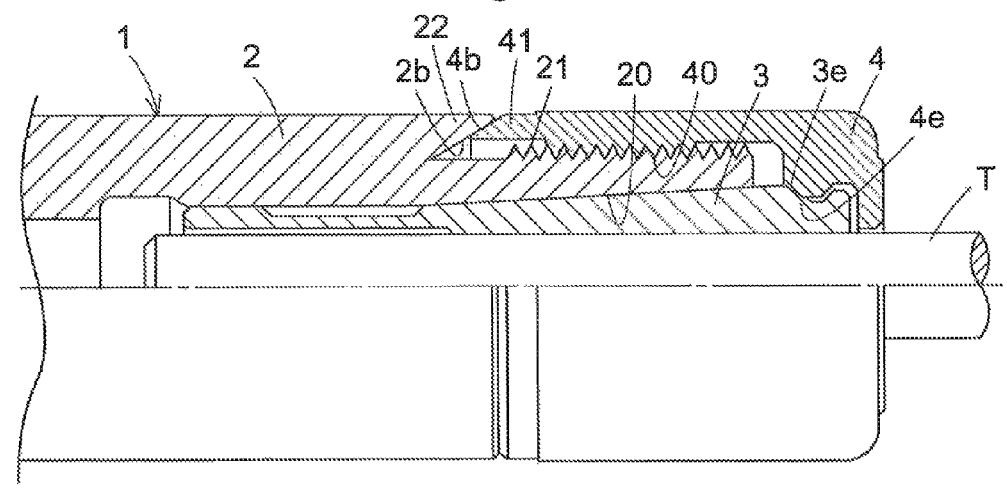
FIG. 2 is a vertical section of the chuck device according to a second embodiment of the present invention.

FIG. 2 is a vertical section of the chuck device 1 relating to a second embodiment of the present invention. A first nut rear end side tapered surface 4b is formed in an outer circumferential surface of the nut rear end portion 41 while a chuck body side tapered surface 2b is formed in an inner circumferential surface of a chuck body projecting portion 22. Those tapered surfaces are brought into contact with each other when the nut 4 is screwed to the chuck body 2. Apart from those arrangements, the current embodiment is the same as the first embodiment.

In the current embodiment, the diameter of the chuck body projecting portion 22 provided radially outward is increased and the diameter the nut rear end portion 41 is reduced due to thickness distribution, thereby to allow the nut rear end portion 41 to be pressed radially inward. This prevents the nut rear end portion 41 from relatively moving radially outward, thereby to suppress the non-alignment of the nut 4 relative to the chuck body 2.

While FIG. 2 shows the mode in which a radial space is defined between the chuck body 2 and the nut rear end portion 41, the nut rear end portion 41 may be pressed against the chuck body projecting portion 22 when the tapered surfaces come into contact with each other, thereby to bring the nut rear end portion 41 into contact with the chuck body 2.

Third Embodiment

Figure 3:
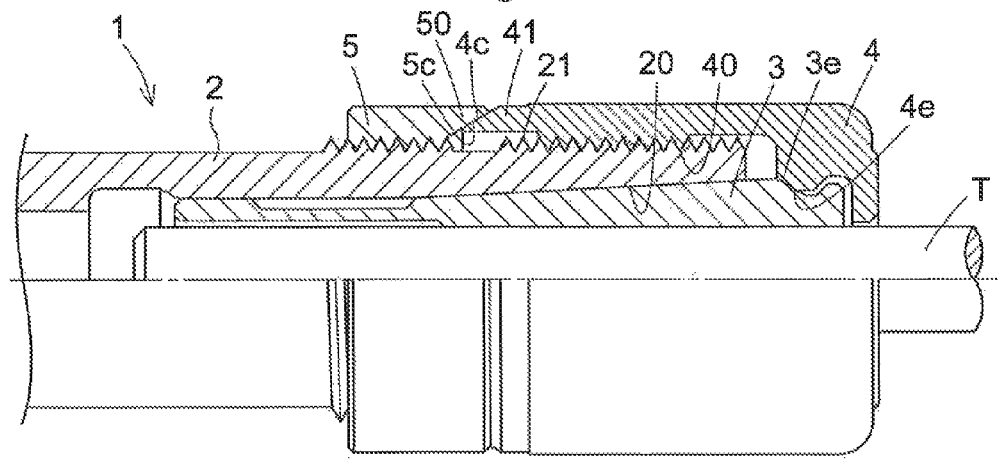
FIG. 3 is a vertical section of the chuck device according to a third embodiment of the present invention.

FIG. 3 is a vertical section of the chuck device 1 relating to a third embodiment of the present invention. In the current embodiment, a second nut rear end tapered surface 4c is formed in the outer circumferential surface of the nut 4 at the farther rear end side than the screw portion 40. In addition, a ring member side tapered surface 5c is formed in an inner circumferential surface of a ring member 5 screwable to the chuck body 2. When the ring member 5 is screwed to the chuck body 2 with the nut 4 being screwed to the chuck body 2, the second nut rear end side tapered surface 4c is brought into contact with the ring member side tapered surface 5c.

Since the phenomenon and effect of the process in contact between the tapered surfaces are the same as the second embodiment, an explanation thereon will be omitted here. While FIG. 3 shows the mode in which a radial space is defined between the chuck body 2 and the nut rear end portion 41, the nut rear end portion 41 may be pressed against a ring member front end portion 50 when the tapered surfaces come into contact with each other, thereby to bring the nut rear end portion 41 into contact with the chuck body 2.

Fourth Embodiment

Figure 4:
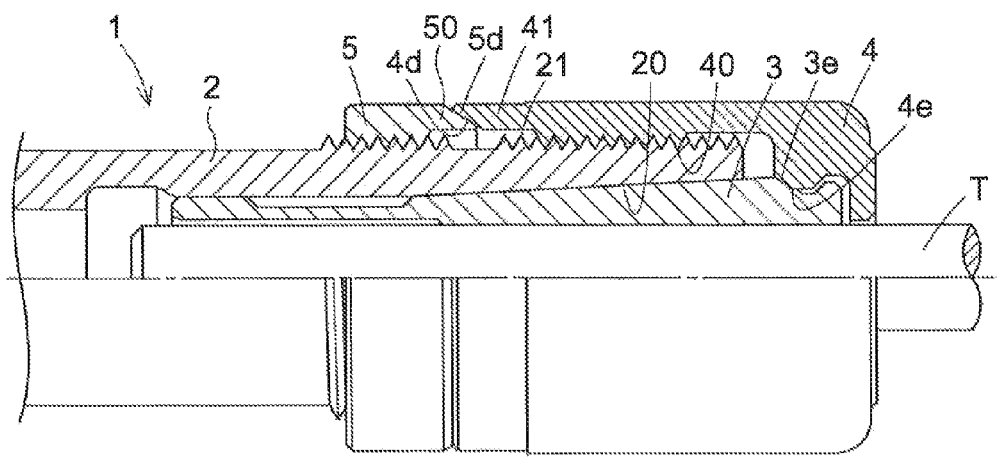
FIG. 4 is a vertical section of the chuck device according to a fourth embodiment of the present invention.

FIG. 4 is a vertical section of the chuck device 1 relating to a fourth embodiment of the present invention. In the current embodiment, the tapered shapes of the third embodiment are reversed. More particularly, a second nut rear end side tapered surface 4d is formed in the inner circumferential surface of the nut 4, while a ring member side tapered surface 5d is formed in the outer circumferential surface of the ring member 5. When the ring member 5 is screwed to the chuck body 2 with the nut 4 being screwed to the chuck body 2, those tapered surfaces are brought into contact with each other.

When the second nut rear end side tapered surface 4d is brought into contact with the ring member side tapered surface 5d, the diameter of the nut rear end portion 41 is increased, and a elastic force exerted radially inward is produced. Such a elastic force serves to press the nut 4 against the chuck body 2 through the ring member 5, thereby to prevent the non-alignment of the nut 4.

While FIG. 4 shows the mode in which a radial space is defined between the chuck body 2 and the ring member front end portion 50, the ring member front end portion 50 may be pressed against the nut rear end portion 41 when the tapered surfaces come into contact with each other, thereby to bring the ring member front end portion 50 into contact with the chuck body 2.

According to the third and fourth embodiments, the ring member 5 is screwed to the chuck body 2. Instead, any other mounting structure can be employed as long as the ring member 5 is fixed to the chuck body 2. Further, the structure for suppressing the non-alignment of the ring member 5 more reliably may be selected by providing a guide portion in the ring member 5 or eliminating a gap between the ring member 5 and any other member when fixed.

Fifth Embodiment

Figure 5:
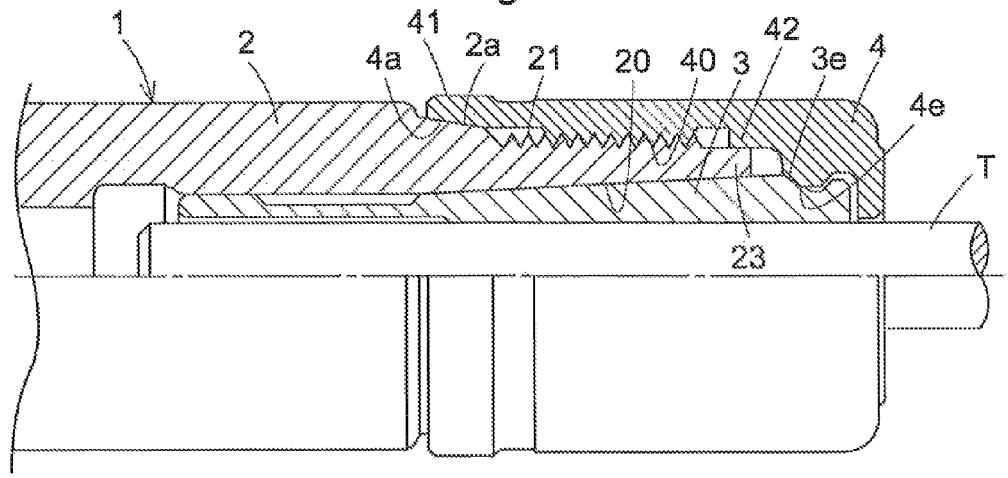
FIG. 5 is a vertical section of the chuck device according to a fifth embodiment of the present invention.
Figure 6:
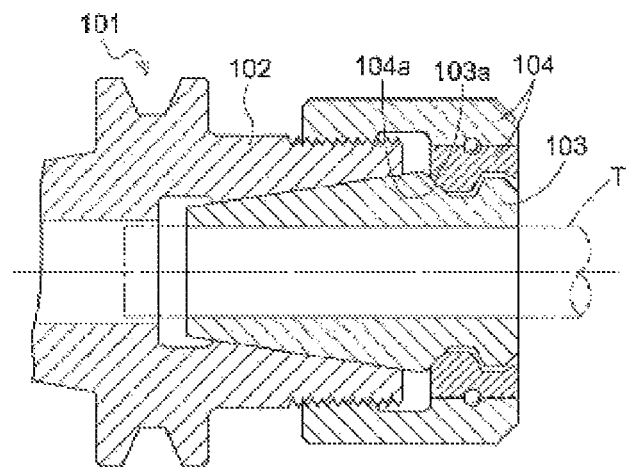
FIG. 6 is a vertical section of a conventional chuck device.
Figure 7:
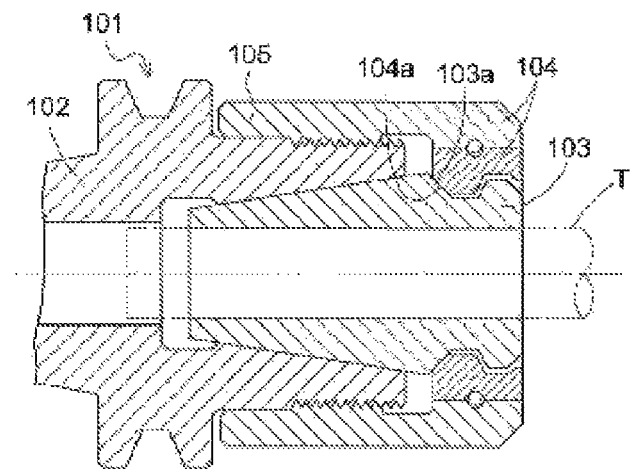
FIG. 7 is a vertical section of another conventional chuck device.
Figure 8:
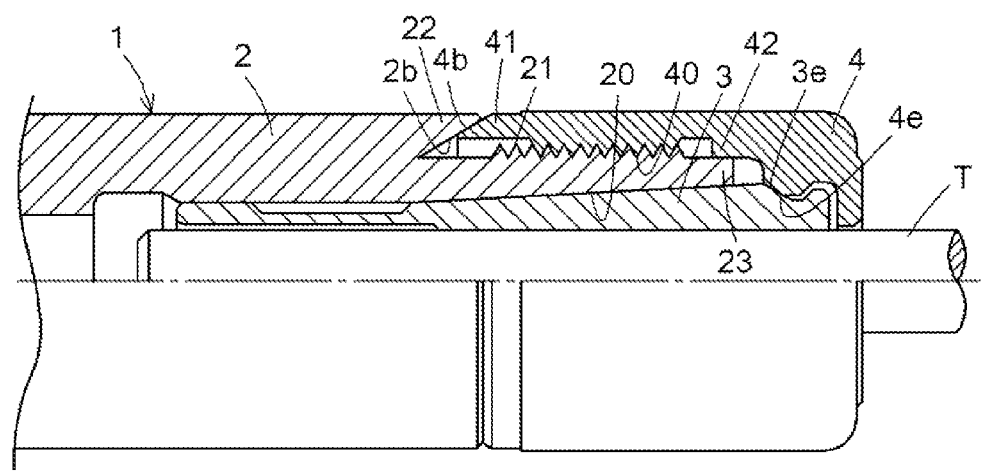
FIG. 8 is a vertical section of the chuck device according to another embodiment of the present invention.

FIG. 5 is a vertical section of the chuck device 1 relating to a fifth embodiment of the present invention. A fitting portion 23 formed in the chuck body 2 at a farther front end side than the screwed portion 21 is configured to relatively rotatably fit to a corresponding fitting portion 42 formed in the nut 40 at a farther front end side than the screw portion 40. Apart from those arrangements, the current embodiment is the same as the first embodiment.

When the chuck body 2 and the nut 4 are fitted to each other by selecting gap fitting or fastening fitting in order to allow relative rotation therebetween, relative movement of the nut 4 in the radial direction at the fitting portions is restricted, thereby to prevent the non-alignment of the nut 4 relative to the chuck body 2. As a result, the non-alignment of the nut 4 relative to the chuck body 2 at the two positions in the vicinity of the front end portion and the rear end portion of the screw portion 40, thereby to improve the function to prevent deflection of the tool T. It should be noted that such an arrangement may be applied to any of the second to fourth embodiments.

In the above-noted embodiments, both the tapered surfaces are brought into face-to-face contact with each other when the nut 4 is screwed. Instead, any other contacting arrangement may be employed as long as the contacting portions are elastically deformable e.g., enlarged or shrinked in diameter, when being brought into contact with each other. For instance, one of the tapered surfaces may have an arc end portion as viewed in section to come into line-to-line contact with the other of the tapered surfaces.

INDUSTRIAL USABILITY

A chuck device is provided for suppressing non-alignment of a nut relative to a chuck body to prevent deflection of a tool when a main rotational shaft of a machine tool is rotated at high speed.

The invention claimed is:
1. A chuck device, comprising:
a chuck body that has a tapered hole radially inside and at a front end thereof, the chuck body having at an outer surface thereof:
a chuck fitting portion that is located at the front end;
a chuck screw portion that has a screw thread having an outer diameter which is larger than that of the chuck fitting portion; and
a chuck tapered surface that is inclined with an angle with respect to an axial direction of the chuck body, having an outer diameter that decreases in the axial direction toward the front end from a rear end of the chuck body, the outer diameter being larger that that of the chuck screw portion, wherein
the chuck fitting portion, the chuck screw portion and the chuck tapered surface are arranged in this order in the axial direction from the front end to the rear end;
a collet that has an outer shape corresponding to the tapered hole of the chuck body and that is configured to hold a tool inside; and
a nut that has a hollow space radially inside, the nut having in the hollow space:
a nut fitting portion that has an inner diameter which is substantially the same as the outer diameter of the chuck fitting portion;
a nut screw portion that has a screw thread having an inner diameter which is larger than that of the nut fitting portion, and is configured to engage with the chuck screw portion; and
a nut tapered surface that is inclined with an angle with respect to the axial direction, having an inner diameter that decreases in the axial direction toward the front end, the inner diameter being larger than that of the nut screw portion, wherein the nut fitting portion, the nut screw portion and the nut tapered surface are arranged in this order in the axial direction from the front end to the rear end, wherein when the nut is attached to the chuck body accommodating the collet in the tapered hole of the chuck body, the nut fitting portion meets the chuck fitting portion making a first contact point, and the nut tapered surface meets the chuck tapered surface making a second contact point so that the nut is supported by the chuck body at two points, further the angle of the nut tapered surface corresponds to the angle of the chuck tapered surface and a nut rear end portion, which is at the rear end of the nut and includes the nut tapered surface, is deflectable in a radial direction of the chuck body so that the nut tapered surface is in contact with the chuck tapered surface and slidable on the surface of the chuck tapered surface while the nut is further screwed, causing a radially inward force to secure the chuck body.

2. The chuck device as claimed in claim 1, wherein the collet has a collet tapered surface that is inclined, and is located in the direction opposing to the axial direction from the chuck fitting portion, the nut has a front tapered surface that is inclined corresponding to the collet tapered surface, and that has an inner diameter which is smaller than that of the nut fitting portion, and which is located in the direction opposing to the axial direction from the nut fitting portion, and when the nut is attached to the chuck body, the front tapered surface meets the collet tapered surface making an additional contact point so that the collet is supported by the tapered hole of the chuck body and the additional contact point between the nut and the collet.

3. A chuck device, comprising:

a chuck body that has a tapered hole radially inside and at a front end thereof, the chuck body having at an outer surface thereof:

a chuck fitting portion that is located at the front end;

a chuck screw portion that has a screw thread having an outer diameter which is larger than that of the chuck fitting portion; and a chuck tapered surface that is inclined facing radially inwardly and having an inner diameter that increases in an axial direction toward the front end from a rear end of the chuck body, the inner diameter being larger than that of the chuck screw portion, wherein the chuck fitting portion, the chuck screw portion and the chuck tapered surface are arranged in this order in the axial direction from the front end to the rear end;

a collet that has an outer shape corresponding to the tapered hole of the chuck body and that is configured to hold a tool inside; and a nut that has a hollow space radially inside, the nut having:

a nut fitting portion that is inside thereof and has an inner diameter which is substantially the same as the outer diameter of the chuck fitting portion, a nut screw portion that is inside thereof and has a screw thread having an inner diameter which is larger than that of the nut fitting portion, and is configured to engage with the chuck screw portion; and a nut tapered surface that is inclined facing radially outwardly and having an outer diameter that increases in the axial direction toward the front end, the outer diameter being lager than that of the nut screw portion, wherein the nut fitting portion, the nut screw portion and the nut tapered surface are arranged in this order in the axial direction from the front end to the rear end, wherein when the nut is attached to the chuck body accommodating the collet in the tapered hole of the chuck body, the nut fitting portion meets the chuck fitting portion making a first contact point, and the nut tapered surface meets the chuck tapered surface making a second contact point so that the nut is supported by the chuck body at two points.

4. The chuck device as claimed in claim 3, wherein the collet has a collet tapered surface that is inclined, and is located in the direction opposing to the axial direction from the chuck fitting portion, the nut has a front tapered surface that is inclined corresponding to the collet tapered surface, and that has an inner diameter which is smaller than that of the nut fitting portion, and which is located in the direction opposing to the axial direction from the nut fitting portion, and when the nut is attached to the chuck body, the front tapered surface meets the collet tapered surface making an additional contact point so that the collet is supported by the tapered hole of the chuck body and the additional contact point between the nut and the collet.

5. The chuck device as claimed in claim 1, wherein a recess portion is provided on a surface of the nut and between the nut screw portion and the nut tapered surface with respect to the axial direction.

* * * * *